United States Patent
Tsai et al.

(10) Patent No.: US 10,673,287 B2
(45) Date of Patent: Jun. 2, 2020

(54) METHOD AND SUPPLYING-END MODULE FOR DETECTING RECEIVING-END MODULE

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 0 days.

(21) Appl. No.: 16/248,815

(22) Filed: Jan. 16, 2019

(65) Prior Publication Data
US 2019/0148993 A1    May 16, 2019

Related U.S. Application Data

(63) Continuation-in-part of application No. 15/836,904, filed on Dec. 10, 2017, which is a (Continued)

(30) Foreign Application Priority Data

Feb. 1, 2011  (TW) .............................. 100103836 A
May 3, 2013  (TW) .............................. 102115983 A
(Continued)

(51) Int. Cl.
*H02J 50/90* (2016.01)
*H02J 50/12* (2016.01)
(Continued)

(52) U.S. Cl.
CPC .............. *H02J 50/90* (2016.02); *H02J 7/025* (2013.01); *H02J 50/12* (2016.02); *H02J 50/40* (2016.02);
(Continued)

(58) Field of Classification Search
CPC ............. H02J 50/12; H02J 50/90; H02J 50/80
See application file for complete search history.

(56) References Cited

U.S. PATENT DOCUMENTS 3,573,817 A    4/1971  Akers
7,939,963 B2    5/2011  Chang
(Continued)

FOREIGN PATENT DOCUMENTS

CN    101399464 A    4/2009
CN    102396131 A    3/2012
(Continued)

OTHER PUBLICATIONS

Ma et al., Analysis of metal foreign object setting on electric vehicle wireless power transfer system, <Advanced Technology of Electrical Engineering and Energy> vol. 36, No. 2, p. 14-20 ,Feb. 28, 2017.

*Primary Examiner* — Daniel J Cavallari
(74) *Attorney, Agent, or Firm* — Winston Hsu (57) ABSTRACT

A method of detecting a receiving-end module for a supplying-end module of an induction type power supply system, wherein the supplying-end module includes a supplying-end coil, includes the steps of: detecting a resonant frequency of the supplying-end coil; determining a coil distance of the receiving-end module and the supplying-end module according to the resonant frequency; obtaining a maximum resonant voltage and a minimum resonant voltage corresponding to the coil distance; and determining whether there is a deviation between the supplying-end module and the receiving-end module according to the maximum resonant voltage and the minimum resonant voltage and an input current of the supplying-end coil.

10 Claims, 6 Drawing Sheets

Related U.S. Application Data continuation-in-part of application No. 15/231,795, filed on Aug. 9, 2016, now Pat. No. 10,289,142, which is a continuation-in-part of application No. 15/005,014, filed on Jan. 25, 2016, now Pat. No. 10,114,396, and a continuation-in-part of application No. 15/197,796, filed on Jun. 30, 2016, now Pat. No. 10,312,748, which is a continuation-in-part of application No. 14/822,875, filed on Aug. 10, 2015, now Pat. No. 9,960,639, and a continuation-in-part of application No. 14/731,421, filed on Jun. 5, 2015, now Pat. No. 10,038,338, which is a continuation-in-part of application No. 13/541,090, filed on Jul. 3, 2012, now Pat. No. 9,075,587, and a continuation-in-part of application No. 14/017,321, filed on Sep. 4, 2013, now Pat. No. 9,628,147, which is a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072, said application No. 14/017,321 is a continuation-in-part of application No. 13/541,090, filed on Jul. 3, 2012, now Pat. No. 9,075,587, said application No. 15/197,796 is a continuation-in-part of application No. 14/876,788, filed on Oct. 6, 2015, now Pat. No. 9,831,687, which is a continuation-in-part of application No. 14/017,321, filed on Sep. 4, 2013, now Pat. No. 9,628,147.

(30) Foreign Application Priority Data

| Date | | |
|---|---|---|
| Jan. 14, 2015 | (TW) | 104101227 A |
| Jun. 2, 2015 | (TW) | 104117722 A |
| Jun. 30, 2015 | (TW) | 104121025 A |
| Oct. 28, 2015 | (TW) | 104135327 A |
| Apr. 14, 2016 | (TW) | 105111620 A |
| May 13, 2016 | (TW) | 105114827 A |
| Sep. 14, 2017 | (TW) | 106131521 A |
| Oct. 9, 2018 | (TW) | 107135523 A |

(51) Int. Cl.
H02J 50/80 (2016.01)
H02J 7/02 (2016.01)
H02J 50/40 (2016.01)
H02J 7/00 (2006.01)

(52) U.S. Cl.
CPC ........... *H02J 50/80* (2016.02); *H02J 7/00034* (2020.01); *H02J 7/00045* (2020.01)

(56) References Cited

U.S. PATENT DOCUMENTS

| | | |
|---|---|---|
| 8,422,420 B1 | 4/2013 | Gulasekaran |
| 8,731,116 B2 | 5/2014 | Norconk |
| 9,143,002 B2 | 9/2015 | Yeo |
| 9,318,897 B2 | 4/2016 | Brohlin |
| 9,531,444 B2 | 12/2016 | Bae |
| 9,553,485 B2 | 1/2017 | Singh |
| 9,995,777 B2 | 6/2018 | Von Novak, III |
| 10,056,944 B2 | 8/2018 | Tsai |
| 10,122,220 B2 | 11/2018 | Sankar |
| 2005/0076102 A1 | 4/2005 | Chen |
| 2005/0258826 A1 | 11/2005 | Kano |
| 2008/0106273 A1 | 5/2008 | Bauer |
| 2009/0026844 A1 | 1/2009 | Iisaka |
| 2009/0167300 A1 | 7/2009 | Cech |
| 2009/0278651 A1 | 11/2009 | Okada |
| 2009/0319212 A1 | 12/2009 | Cech |
| 2010/0098177 A1 | 4/2010 | Hamaguchi |
| 2010/0213590 A1 | 8/2010 | Warren |
| 2010/0225173 A1 | 9/2010 | Aoyama |
| 2010/0237943 A1 | 9/2010 | Kim |
| 2011/0062793 A1 | 3/2011 | Azancot |
| 2011/0097996 A1 | 4/2011 | Kalanithi |
| 2011/0199046 A1 | 8/2011 | Tsai |
| 2011/0241436 A1 | 10/2011 | Furukawa |
| 2012/0153739 A1 | 6/2012 | Cooper |
| 2012/0169132 A1 | 7/2012 | Choudhary |
| 2013/0015705 A1 | 1/2013 | Abe |
| 2013/0049484 A1 | 2/2013 | Weissentern |
| 2013/0057079 A1 | 3/2013 | Park |
| 2013/0065518 A1 | 3/2013 | Byun |
| 2013/0082653 A1 | 4/2013 | Lee |
| 2013/0106197 A1 | 5/2013 | Bae |
| 2013/0147279 A1 | 6/2013 | Muratov |
| 2013/0162054 A1 | 6/2013 | Komiyama |
| 2013/0162204 A1 | 6/2013 | Jung |
| 2013/0175937 A1 | 7/2013 | Nakajo |
| 2013/0176023 A1 | 7/2013 | Komiyama |
| 2013/0187476 A1 | 7/2013 | Tsai |
| 2013/0234503 A1* | 9/2013 | Ichikawa ............ H02J 5/005 307/9.1 |
| 2013/0267213 A1 | 10/2013 | Hsu |
| 2014/0015329 A1 | 1/2014 | Widmer |
| 2014/0024919 A1 | 1/2014 | Metzenthen |
| 2014/0077616 A1 | 3/2014 | Baarman |
| 2014/0152251 A1 | 6/2014 | Kim |
| 2014/0184152 A1 | 7/2014 | Van Der Lee |
| 2014/0197783 A1 | 7/2014 | Kim |
| 2014/0333153 A1 | 11/2014 | Tanaka |
| 2014/0339907 A1 | 11/2014 | Omae |
| 2014/0355314 A1 | 12/2014 | Ryan |
| 2015/0008756 A1 | 1/2015 | Lee |
| 2015/0028875 A1 | 1/2015 | Irie |
| 2015/0044966 A1 | 2/2015 | Shultz |
| 2015/0123602 A1 | 5/2015 | Patino |
| 2015/0162054 A1 | 6/2015 | Ishizu |
| 2015/0162785 A1 | 6/2015 | Lee |
| 2015/0180286 A1 | 6/2015 | Asanuma |
| 2015/0263531 A1 | 9/2015 | Kozakai |
| 2015/0285926 A1 | 10/2015 | Oettinger |
| 2015/0349573 A1 | 12/2015 | Tschirhart |
| 2015/0372493 A1 | 12/2015 | Sankar |
| 2015/0372662 A1 | 12/2015 | Niessen |
| 2016/0064951 A1 | 3/2016 | Yamamoto |
| 2016/0064952 A1 | 3/2016 | Matsumoto |
| 2016/0072336 A1 | 3/2016 | Tamino |
| 2016/0241086 A1 | 8/2016 | Jung |
| 2016/0349782 A1 | 12/2016 | Tsai |
| 2018/0034281 A1 | 2/2018 | Tsai |
| 2018/0138756 A1 | 5/2018 | Bae |
| 2018/0241257 A1 | 8/2018 | Muratov |

FOREIGN PATENT DOCUMENTS

| | | |
|---|---|---|
| CN | 102904475 A | 1/2013 |
| CN | 103852631 A | 6/2014 |
| CN | 103855764 A | 6/2014 |
| CN | 103999325 A | 8/2014 |
| CN | 104160300 A | 11/2014 |
| CN | 104253492 A | 12/2014 |
| CN | 204190475 U | 3/2015 |
| CN | 105027387 A | 11/2015 |
| CN | 105226845 A | 1/2016 |
| CN | 105308829 A | 2/2016 |
| CN | 105449875 A | 3/2016 |
| CN | 106094041 A | 11/2016 |
| CN | 106134037 A | 11/2016 |
| CN | 106560730 A | 4/2017 |
| CN | 106685029 A | 5/2017 |
| CN | 107615612 A | 1/2018 |
| EP | 2 555 107 A1 | 2/2013 |
| EP | 3 160 008 A1 | 4/2017 |
| JP | 2016-75484 A | 5/2016 |
| TW | 201315082 A1 | 4/2013 |
| TW | 201417445 A | 5/2014 |

(56) References Cited

FOREIGN PATENT DOCUMENTS

| | | |
|---|---|---|
| TW | 201513523 A | 4/2015 |
| TW | 201605143 A | 2/2016 |
| TW | 201631862 A | 9/2016 |
| WO | 2016/159788 A1 | 10/2016 |
| WO | 2016/181658 A1 | 11/2016 |

\* cited by examiner

METHOD AND SUPPLYING-END MODULE FOR DETECTING RECEIVING-END MODULE

CROSS REFERENCE TO RELATED APPLICATIONS

This application is a continuation-in-part application of U.S. application Ser. No. 15/836,904, filed on Dec. 10, 2017.

U.S. application Ser. No. 15/836,904 is further a continuation-in-part application of U.S. application Ser. No. 15/231,795, filed on Aug. 9, 2016.

U.S. application Ser. No. 15/231,795 is further a continuation-in-part application of U.S. application Ser. No. 15/005,014, filed on Jan. 25, 2016, and a continuation-in-part application of U.S. application Ser. No. 15/197,796, filed on Jun. 30, 2016.

U.S. application Ser. No. 15/197,796 is further a continuation-in-part application of U.S. application Ser. No. 14/822,875, filed on Aug. 10, 2015, a continuation-in-part application of U.S. application Ser. No. 14/731,421, filed on Jun. 5, 2015, and a continuation-in-part application of U.S. application Ser. No. 14/876,788, filed on Oct. 6, 2015.

U.S. application Ser. No. 14/731,421 is further a continuation-in-part application of U.S. application Ser. No. 14/017,321, filed on Sep. 4, 2013, and a continuation-in-part application of U.S. application Ser. No. 13/541,090, filed on Jul. 3, 2012.

U.S. application Ser. No. 14/017,321 is further a continuation-in-part application of U.S. application Ser. No. 13/541,090, filed on Jul. 3, 2012, and a continuation-in-part application of U.S. application Ser. No. 13/212,564, filed on Aug. 18, 2011.

U.S. application Ser. No. 13/212,564 is further a continuation-in-part application of U.S. application Ser. No. 13/154,965, filed on Jun. 7, 2011.

U.S. application Ser. No. 14/876,788 is further a continuation-in-part application of U.S. application Ser. No. 14/017,321, filed on Sep. 4, 2013.

The contents of these applications are incorporated herein by reference.

BACKGROUND OF THE INVENTION

1. Field of the Invention

The present invention relates to a method of detecting a receiving-end module and a related supplying-end module, and more particularly, to a method of detecting the deviation between a supplying-end module and a receiving-end module and the related supplying-end module.

2. Description of the Prior Art

For safety purposes, a power supply device of an induction type power supply system has to ensure that a proper power receiving device is positioned on the sensing area of a supplying-end coil of the power supply device and that the power receiving device is ready to receive power before the power is supplied. In order to allow the power supply device to confirm the above conditions, data codes should be transmitted for identification purposes. The data code transmission is that, the power supply device drives the supplying-end coil to generate resonance and send electromagnetic power to the power receiving device for power delivery. When the power receiving device receives the power, the power receiving device may change the impedance on the receiving-end coil via the signal modulation technology, and the variations are fed back to vary the resonant carrier signals on the supplying-end coil, so as to deliver the data codes.

In the prior art, the positions of the power supply device and the power receiving device and their distance cannot be detected and calculated, such that power adjustment may always be limited within a predetermined maximum resonant voltage and may not be adjusted according to the distance. In such a condition, when the power supply device and the power receiving device are nearer to each other, the power receiving device may be burnt out due to an excessively large output power. On the contrary, when the power supply device and the power receiving device have a further distance, the received output power may become excessively small causing the power receiving device to interrupt its operations due to insufficient power supply. Thus, there is a need for improvement over the prior art.

SUMMARY OF THE INVENTION

It is therefore an objective of the present invention to provide a method of detecting a receiving-end module, detecting the distance between a receiving-end module and a supplying-end module, and setting the maximum resonant voltage and the minimum resonant voltage of the supplying-end coil according to the distance, so as to determine whether there is a deviation between the supplying-end module and the receiving-end module according to the coil voltage and the current magnitude.

An embodiment of the present invention discloses a method of detecting a receiving-end module for a supplying-end module of an induction type power supply system. The supplying-end module comprises a supplying-end coil. The method comprises the steps of: detecting a resonant frequency of the supplying-end coil; determining a coil distance of the receiving-end module and the supplying-end module according to the resonant frequency; obtaining a maximum resonant voltage and a minimum resonant voltage corresponding to the coil distance; and determining whether there is a deviation between the supplying-end module and the receiving-end module according to the maximum resonant voltage and the minimum resonant voltage and an input current of the supplying-end coil.

Another embodiment of the present invention discloses a supplying-end module for an induction type power supply system. The supplying-end module comprises a supplying-end coil, a current detector and a processor. The current detector is configured to detect an input current of the supplying-end coil. The processor, coupled to the supplying-end coil, is configured to perform the following steps: detecting a resonant frequency of the supplying-end coil; determining a coil distance of the receiving-end module and the supplying-end module according to the resonant frequency; obtaining a maximum resonant voltage and a minimum resonant voltage corresponding to the coil distance; and determining whether there is a deviation between the supplying-end module and the receiving-end module according to the maximum resonant voltage and the minimum resonant voltage and the input current.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
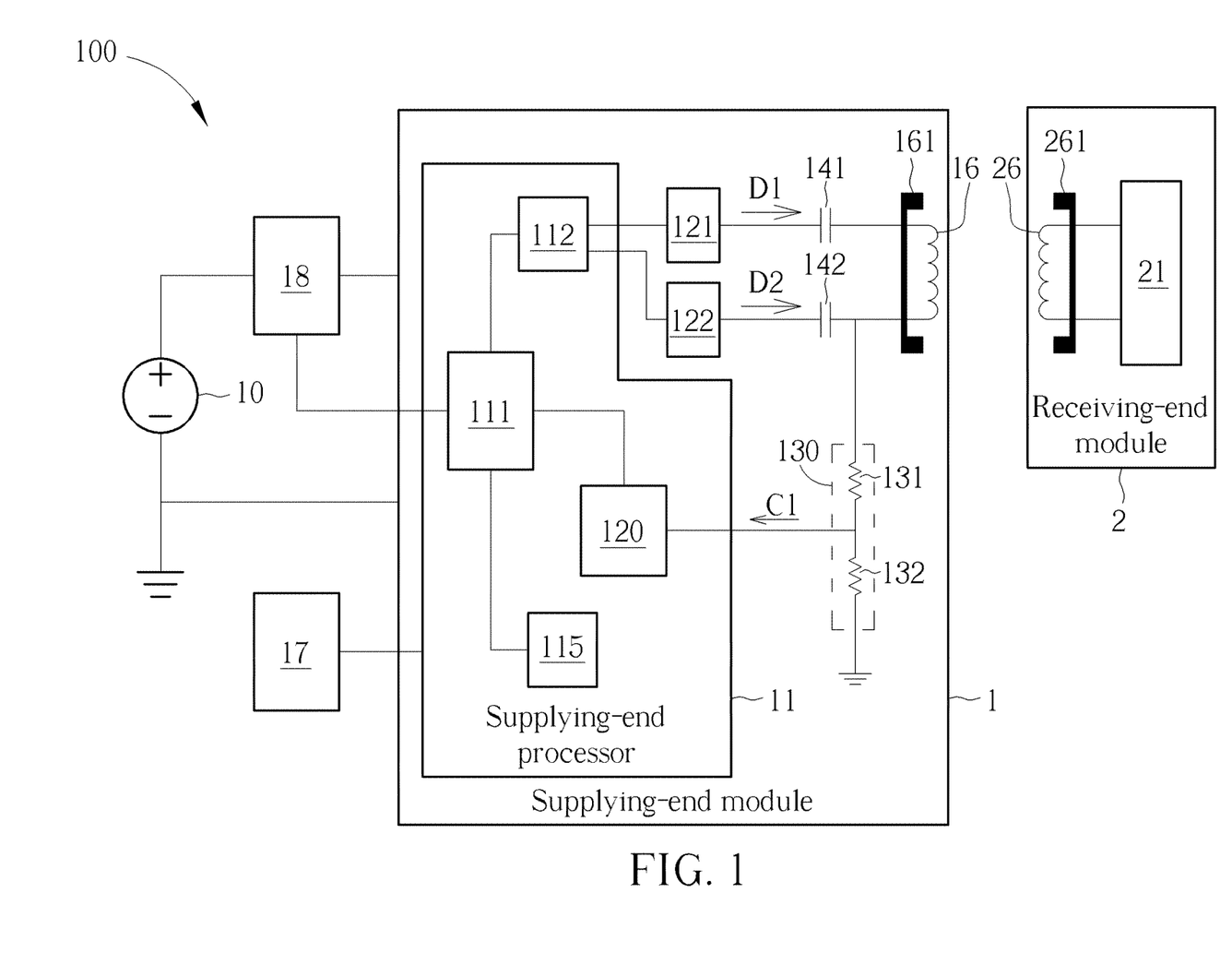
FIG. 1 is a schematic diagram of an induction type power supply system according to an embodiment of the present invention.

Please refer to FIG. 1, which is a schematic diagram of an induction type power supply system 100 according to an embodiment of the present invention. As shown in FIG. 1, the induction type power supply system 100 includes a supplying-end module 1 and a receiving-end module 2. The supplying-end module 1 is configured to receive electric power from a power source 10 and output wireless power to the receiving-end module 2. The supplying-end module 1 includes a supplying-end coil 16 and resonant capacitors 141 and 142, disposed as a C-L-C structure. The supplying-end coil 16 is used for delivering electromagnetic energies to the receiving-end module 2 to supply power. The resonant capacitors 141 and 142, coupled to the two terminals of the supplying-end coil 16, respectively, is used for performing resonance together with the supplying-end coil 16 for power supply. In addition, in the supplying-end module 1, a magnetic conductor 161 composed of magnetic materials may be selectively disposed, to enhance the electromagnetic induction capability of the supplying-end coil 16 and also prevent electromagnetic energies from affecting the objects located in the non-inducting side of the coil.

In order to control the operations of the supplying-end coil 16 and the resonant capacitors 141 and 142, the supplying-end module 1 further includes a supplying-end processor 11, power driver units 121 and 122, and a voltage dividing circuit 130. The power driver units 121 and 122, coupled to the supplying-end coil 16 and the resonant capacitors 141 and 142, are used for sending driving signals D1 and D2 to the supplying-end coil 16, respectively. The power driver units 121 and 122 may be controlled by the supplying-end processor 11, for driving the supplying-end coil 16 to generate and send power. When the power driver units 121 and 122 are both active, full-bridge driving is performed. In another embodiment, only one of the power driver units 121 and 122 is active or only one of the power driver units 121 and 122 is disposed, which leads to half-bridge driving. The supplying-end processor 11 widely refers to any processing circuit responsible for various controls in the supplying-end module 1, and may be used for processing and controlling various operations of the supplying-end module 1.

In detail, the supplying-end processor 11 includes a processing unit 111, a clock generator 112, a memory unit 115 and a signal receiving module 120. The processing unit 111 is used for processing and controlling various operations of the supplying-end module 1. The clock generator 112, coupled to the power driver units 121 and 122, is used for controlling the power driver units 121 and 122 to send the driving signals D1 and D2. The clock generator 112 maybe a pulse width modulation (PWM) generator or other type of clock generator, which may output a clock signal to the power driver units 121 and 122. The processing unit 111 may control the power driver units 121 and 122 to adjust the output power and the resonant voltage of coil and perform calculation to obtain various parameters required by the supplying-end module 1 according to the coil signal C1 of the supplying-end coil 16 received by the signal receiving module 120. The processing unit 111 may be a central processing unit (CPU) or other type of processing device or computation device. The memory unit 115 is used for storing the required information for operations of the processing unit 111, and may be realized with various types of memories such as a read-only memory (ROM), random access memory (RAM), flash memory, optical storage media, any other type of memory, or combination of multiple types of memories. The signal receiving module 120 may receive the coil signal C1 and convert it into messages readable by the processing unit 111, and then transmit the message to the processing unit 111. The detailed structures and operations of the signal receiving module 120 are recited in U.S. Publication No. 2018/0102677 A1 (i.e., the comparator module), and will not be narrated herein. The voltage dividing circuit 130, which includes voltage dividing resistors 131 and 132, may attenuate the coil signal C1 on the supplying-end coil 16 and then output the coil signal C1 to the processing unit 111 and the signal receiving module 120. In some embodiments, if the endurance voltages of the processing unit 111 and the signal receiving module 120 are high enough, the voltage dividing circuit 130 may not be disposed and the signal receiving module 120 may directly receive the coil signal C1 from the supplying-end coil 16.

In addition, FIG. 1 further illustrates a power source 10, an input unit 17 and a current detector 18. In detail, the power source 10 may be a DC or AC power source for providing electric power for the induction type power supply system 100 to output to the loads and electric power required by the induction type power supply system 100 itself. The input unit 17 provides a user interface for receiving the settings inputted by the user. The current detector 18 may be used for detecting the input current of the supplying-end module 1 or the supplying-end coil 16. In FIG. 1, the above devices/modules are independent from the supplying-end module 1, but in another embodiment, these devices/modules may be integrated inside the supplying-end module 1 or realized by other methods, which are not limited herein.

Please keep referring to FIG. 1. The receiving-end module 2 includes a load unit 21 and a receiving-end coil 26. In the receiving-end module 2, a magnetic conductor 261 composed of magnetic materials may also be selectively disposed, to enhance the electromagnetic induction capability of the receiving-end coil 26 and also prevent electromagnetic energies from affecting the objects located in the non-inducting side of the coil. The receiving-end coil 26 may receive electric power from the supplying-end coil 16 and then transmit the power to the load unit 21 after the power is rectified. In the receiving-end module 2, other possible components or modules such as a rectification circuit, regulating capacitor, signal feedback circuit, and receiving-end processor maybe included or not according to system requirements. These components are omitted herein without affecting the illustrations of the present embodiments.

Figure 2A:
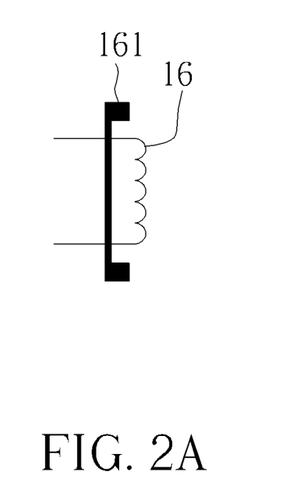
FIG. 2A is a schematic diagram of the supplying-end coil in an idle status.

The supplying-end processor 11 of the induction type power supply system 100 may determine the distance between the supplying-end coil 16 and receiving-end coil 26 by detecting the self-resonant frequency of the supplying-end coil 16. When the distance between the receiving-end coil 26 and the supplying-end coil 16 is nearer, the detected resonant frequency may be smaller. When the distance between the receiving-end coil 26 and the supplying-end coil 16 is further, the detected resonant frequency may be larger. The detailed operations of detecting the distance are illustrated in U.S. Publication No. 2018/0102677 A1, and will not be narrated herein. In general, when there is no receiving-end module or other object approaching the supply-end end coil 16, the supplying-end coil 16 is in an idle status, as shown in FIG. 2A. After the supplying-end module 1 is powered on, the supplying-end module 1 may detect the resonant frequency of the supplying-end coil 16 and determine whether the detected resonant frequency is identical to a predetermined resonant frequency in the idle status. If they are not identical, there may be another object near the supplying-end coil 16 or the supplying-end coil 16 may be malfunctioned. In such a condition, the supplying-end module 1 may disable the power output operations until the detected resonant frequency enters a range complying with the predetermined resonant frequency, and then enable these operations after the resonant frequency enters the proper range.

Figure 2B:
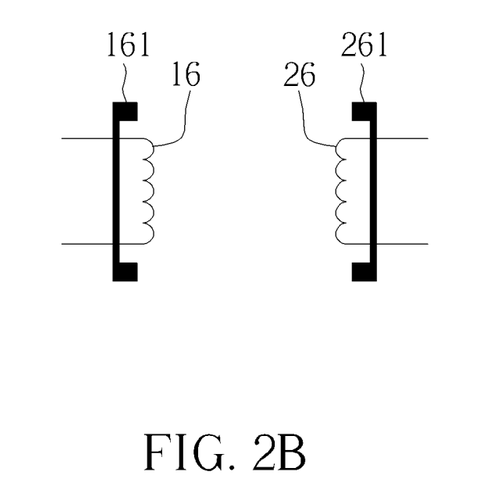
FIG. 2B is a schematic diagram of the supplying-end coil and the receiving-end coil in the furthest operation distance.
Figure 2C:
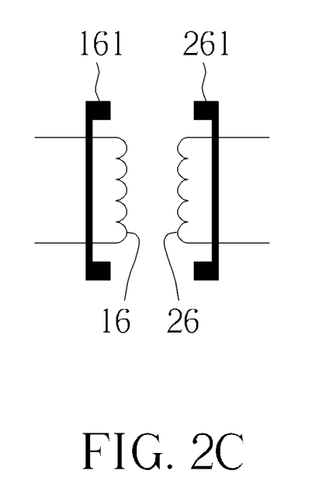
FIG. 2C is a schematic diagram of the supplying-end coil and the receiving-end coil in the nearest operation distance.

When the receiving-end module 2 approaches the supplying-end module 1, the magnetic materials of the magnetic conductor 261 decrease the resonant frequency of the supplying-end coil 16. When the resonant frequency falls to a frequency value corresponding to the furthest operation distance of coil, the supplying-end module 1 may activate the power delivery functions. At this moment, the distance between the supplying-end coil 16 and the receiving-end coil 26 is the furthest operation distance, as shown in FIG. 2B. During power transmissions, the supplying-end module 1 may keep monitoring the resonant frequency. If the resonant frequency appears to exceed the frequency range corresponding to the furthest operation distance of coil, the receiving-end coil 26 may leave away from the operation distance, and the supplying-end module 1 may stop the power transmissions. If the receiving-end coil 26 gradually approaches the supplying-end coil 16, the energies sent by the supplying-end module 1 should be reduced, allowing the receiving-end coil 26 to receive an appropriate power level. However, when the two coils are excessively close to each other, the receiving-end device may receive excessively large energies since the power driver units 121 and 122 of the supplying-end module 1 have a basic driving capability intrinsically. Therefore, if the coil distance is smaller than a nearest operation distance, the supplying-end module 1 may compulsorily stop the power output operations. FIG. 2C illustrates a schematic diagram of the supplying-end coil 16 and the receiving-end coil 26 having the nearest operation distance.

Figure 3:
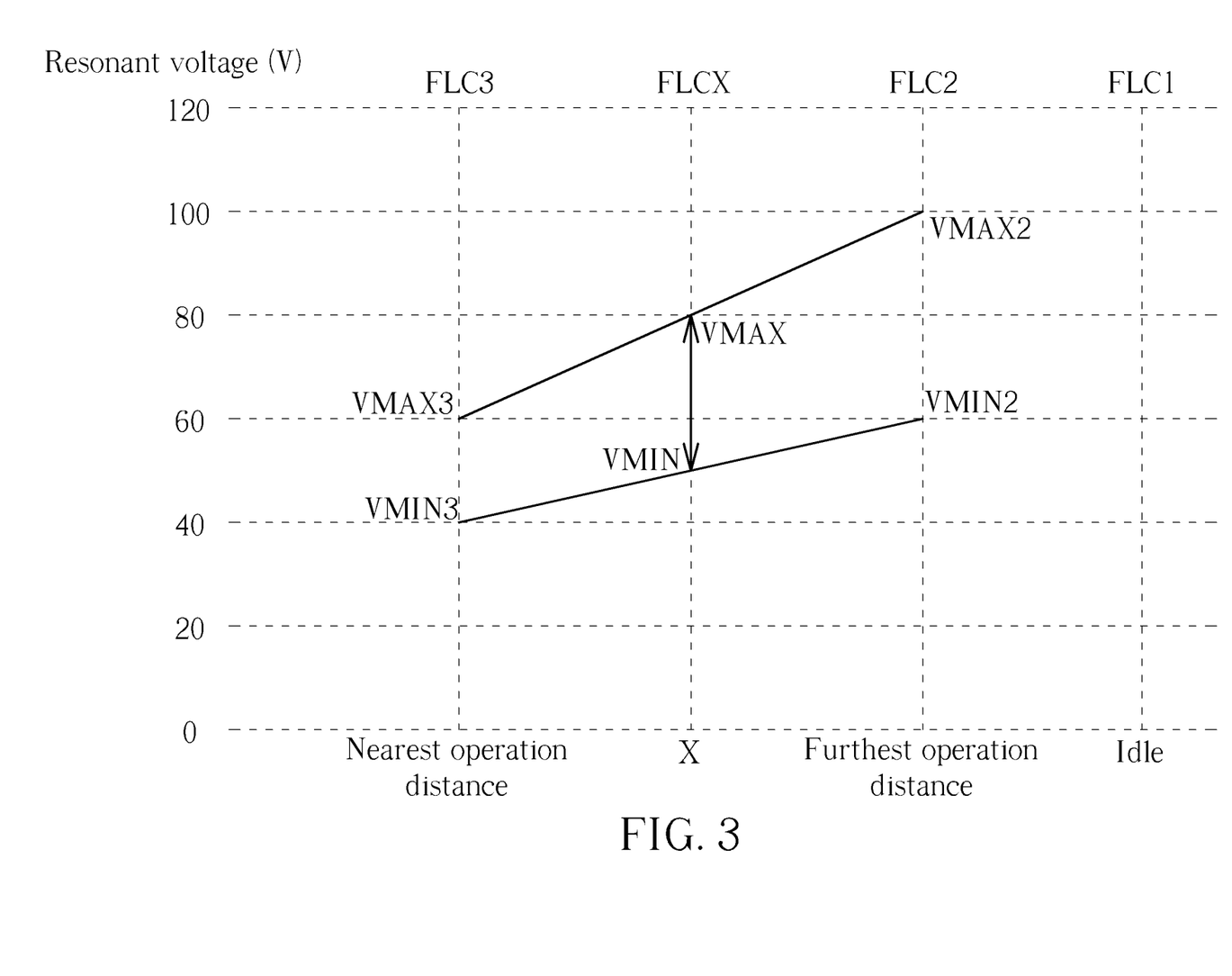
FIG. 3 is a schematic diagram of the resonant frequency and the corresponding resonant voltage of the supplying-end coil according to an embodiment of the present invention.

As can be seen, different resonant frequencies may correspond to different distances between the supplying-end coil 16 and the receiving-end coil 26; hence, the supplying-end processor 11 may determine the coil distance according to the resonant frequency. Please refer to FIG. 3, which is a schematic diagram of the resonant frequency and the corresponding resonant voltage of the supplying-end coil 16 according to an embodiment of the present invention. As shown in FIG. 3, the resonant frequency FLC1 is the self-resonant frequency of the supplying-end coil 16 when it is idle; the resonant frequency FLC2 is the self-resonant frequency of the supplying-end coil 16 at the time when the receiving-end coil 26 approaches such that the distance with the supplying-end coil 16 reaches the furthest operation distance; and the resonant frequency FLC3 is the self-resonant frequency of the supplying-end coil 16 at the instant when the receiving-end coil 26 further approaches the supplying-end coil 16 to reach the nearest operation distance.

Furthermore, in order to allow the supplying-end processor 11 to accurately set the upper limit and lower limit of the resonant voltage, the distance between the supplying-end coil 16 and the receiving-end coil 26 should be determined precisely. Note that far and near of distance are continuous values. Conventionally, in order to achieve accurate settings of upper and lower limits of the resonant voltage, it is required to set multiple distance points between the nearest operation distance and the furthest operation distance and set a maximum value and a minimum value for each distance point. However, when there are more distance points to be set, more memory spaces are required to store the setting values, and the settings may become more complex.

In an embodiment, the supplying-end processor 11 may calculate the upper limit and lower limit of the resonant frequency under different distances by using the setting values of the resonant frequencies under the furthest operation distance and the nearest operation distance. As shown in FIG. 3, the supplying-end processor 11 may obtain a maximum resonant voltage VMAX2 and a minimum resonant voltage VMIN2 corresponding to the furthest operation distance and a maximum resonant voltage VMAX3 and a minimum resonant voltage VMIN3 corresponding to the nearest operation distance. The maximum resonant voltages VMAX2 and VMAX3 and the minimum resonant voltages VMIN2 and VMIN3 may be set up in the supplying-end processor 11 before the product of the induction type power supply system 100 leaves the factory, and/or may be set and modified by a user or manufacturer through the input unit 17. Subsequently, the supplying-end processor 11 may determine the coil distance between the supplying-end coil 16 and the receiving-end coil 26, to calculate the maximum resonant voltage corresponding to the coil distance according to the maximum resonant voltages VMAX2 and VMAX3 and calculate the minimum resonant voltage corresponding to the coil distance according to the minimum resonant voltages VMIN2 and VMIN3. As shown in FIG. 3, the supplying-end processor 11 may obtain the resonant frequency of coil as FLCX, to determine that the distance of the supplying-end coil 16 and the receiving-end coil 26 is X, where the coil distance X is between the furthest operation distance and the nearest operation distance. Note that power supply will be stopped when X departs from the above region. Under the distance X, the maximum resonant voltage VMAX of the supplying-end coil 16 may be obtained with calculations as following:

$$VMAX = \frac{FLCX - FLC3}{FLC2 - FLC3} \times (VMAX2 - VMAX3) + VMAX3;$$

and the minimum resonant voltage VMIN of the supplying-end coil 16 may be obtained with calculations as follows:

$$VMIN = \frac{FLCX - FLC3}{FLC2 - FLC3} \times (VMIN2 - VMIN3) + VMIN3.$$

In other words, the maximum resonant voltage VMAX and the minimum resonant voltage VMIN have linear relationship with the coil distance, and thus their values may be obtained by calculating proportionally. That is, the upper and lower limits of the resonant voltage maybe defined as four terminals at the borders corresponding to the maximum and minimum operation distances of the induction type power supply system 100; hence, for any coil distance within the range of operation distance, the range of operation voltage corresponding to the coil distance maybe calculated based on these four terminals.

In such a condition, the supplying-end processor 11 may set the resonant voltage (i.e., set the output power) according to the maximum resonant voltage VMAX and the minimum resonant voltage VMIN. In an embodiment, the supplying-end processor 11 may adjust the resonant voltage according to information from the receiving-end device. In other words, after receiving energies from the supplying-end module 1, the receiving-end module 2 may measure the energies and convert the measurement result into data, and then transmit the data to the supplying-end module 1 with the data modulation technique. Therefore, the supplying-end module 1 is able to perform adjustment according to the modulation data. The above maximum resonant voltage VMAX and minimum resonant voltage VMIN may be respectively applied as the upper limit and lower limit of the adjusted resonant voltage values, to prevent the problem that an excessively large output power burns out the receiving-end device or an excessively small output power makes the receiving-end device cannot be operated normally in a specific distance. As shown in FIG. 3, if the coil distance is further, the supplying-end module 1 needs to provide higher output power; hence, the supplying-end processor 11 may control the voltage of the supplying-end coil 16 to be between the higher maximum resonant voltage VMAX and the higher minimum resonant voltage VMIN. If the coil distance is nearer, the supplying-end module 1 does not need to provide higher output power; hence, the supplying-end processor 11 may control the voltage of the supplying-end coil 16 to be between the lower maximum resonant voltage VMAX and the lower minimum resonant voltage VMIN.

In addition, the above maximum resonant voltage VMAX and minimum resonant voltage VMIN have another level of meaning. When the supplying-end coil 16 outputs with the maximum resonant voltage VMAX, the output power reaches the maximum value within the operation range; and at this moment, the input current of the supplying-end module 1 also reaches its maximum value. Therefore, the maximum resonant voltage VMAX is the output resonant voltage of the supplying-end module 1 when the receiving-end module 2 of the induction type power supply system 100 has full load, so as to provide full-load power for the receiving-end device. On the contrary, when the supplying-end coil 16 outputs with the minimum resonant voltage VMIN, the output power is the minimum value within the operation range; and at this moment, the input current of the supplying-end module 1 also has the minimum value. Therefore, the minimum resonant voltage VMIN is the output resonant voltage of the supplying-end module 1 when the receiving-end module 2 of the induction type power supply system 100 has no load. With no load, the supplying-end coil 16 does not need to output power for the load, and the related current consumption is approximately equal to 0; hence, most input current of the supplying-end module 1 is used for internal circuits of the supplying-end processor 11, of which the requested current is far smaller than the current requested by the supplying-end coil 16 under a normal load magnitude. In such a situation, the input current of the supplying-end module 1 with no load may approach 0. The region between the maximum resonant voltage VMAX and the minimum resonant voltage VMIN is the operation voltage range under the coil distance X of the supplying-end coil 16, as shown in FIG. 3.

Figure 2D:
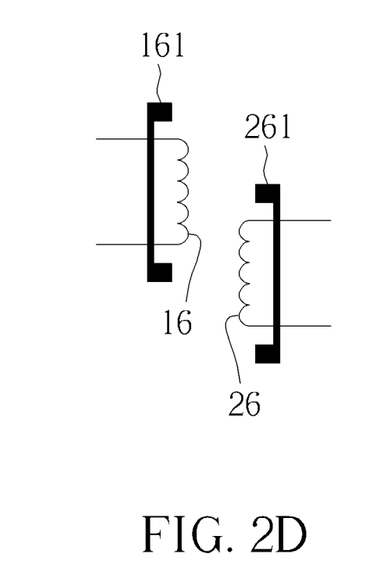
FIG. 2D is a schematic diagram of the supplying-end coil and the receiving-end coil having a horizontal deviation.

As shown in FIGS. 2A-2C, there are various distance correlations between the supplying-end coil 16 and the receiving-end coil 26, and the supplying-end module 1 may determine the coil distance according to the self-resonant frequency of the supplying-end coil 16. However, the supplying-end module 1 may not accurately determine the coil distance in several situations, e.g., when the coil deviation occurs. As shown in FIG. 2D, the supplying-end coil 16 and the receiving-end coil 26 may have a horizontal deviation or dislocation. In such a condition, the distance between centers of the two coils becomes further, such that the power receiving efficiency of the receiving-end device becomes worse; hence, the receiving-end module 2 transmits the modulation data to instruct the supplying-end module 1 to increase output power, allowing the receiving-end device to receive appropriate energies. However, since the magnetic conductors 161 and 261 always have larger areas than the coils, when the coils deviate along the horizontal direction but not become far from each other vertically, the resonant frequency of the supplying-end coil 16 is still influenced by the magnetic conductor 261 accompanied by the receiving-end coil 26. Therefore, the coil distance may be determined to be shorter with the calculations based on the resonant frequency. In such a condition, the supplying-end module 1 may easily underestimate the distance between the supplying-end coil 16 and the receiving-end coil 26, and thus obtain underestimated maximum resonant voltage VMAX and minimum resonant voltage VMIN.

Figure 4:
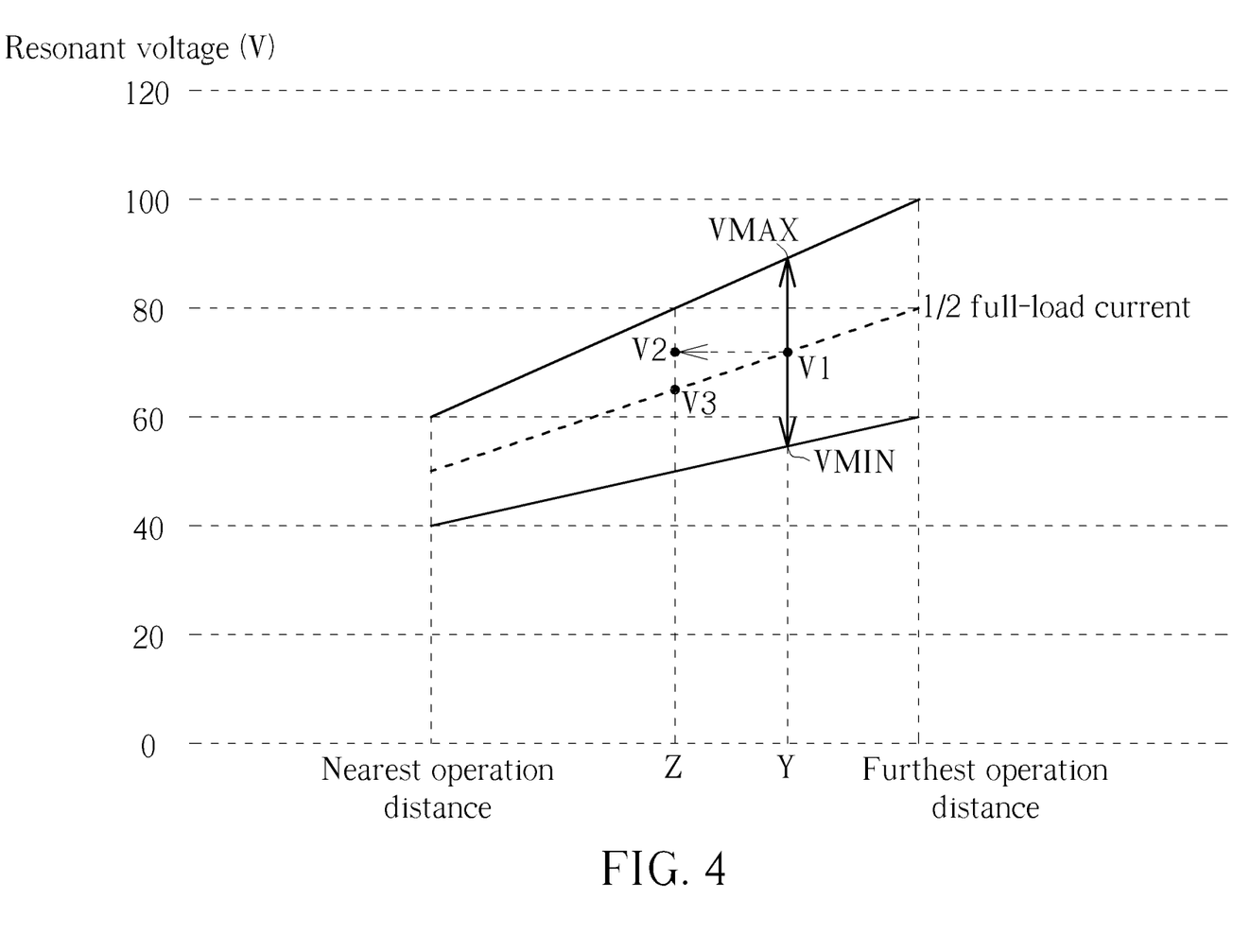
FIG. 4 is a schematic diagram of the operation voltage of coil and the corresponding input current according to an embodiment of the present invention.

Please refer to FIG. 4, which is a schematic diagram of the operation voltage of coil and the corresponding input current according to an embodiment of the present invention. For easy illustrations, FIG. 4 illustrates the operation voltage range identical to that shown in FIG. 3. As mentioned above, the maximum resonant voltage VMAX and the minimum resonant voltage VMIN correspond to the input current of the supplying-end module 1 with full load and no load, respectively, when the coil distance is Y. Therefore, the supplying-end processor 11 may estimate the voltage when the input current is equal to a half of full-load current, where the voltage is substantially equal to the middle point between the maximum resonant voltage VMAX and the minimum resonant voltage VMIN, forming the dotted line shown in FIG. 4. Therefore, when the coil distance is Y and the input current equals a half of full-load current, the resonant voltage of coil should be equal to V1.

As mentioned above, when a horizontal deviation occurs between the supplying-end coil 16 and the receiving-end coil 26 (as the situation shown in FIG. 2D), the supplying-end module 1 easily underestimates the distance of the supplying-end coil 16 and the receiving-end coil 26. If the real coil distance is Y, the supplying-end module 1 may calculate to determine that the coil distance is Z. In such a condition, the resonant voltage of the supplying-end module 1 is V2 (equal to V1), which is higher than the expected resonant voltage V3 of the supplying-end module 1 when the input current is equal to a half of full-load current and the coil distance is determined to be Z. In other words, taking the predicted resonant voltage value and its corresponding current as a basis, when the real resonant voltage is excessively large, the supplying-end processor 11 of the supplying-end module 1 may determine that the induction efficiency of coil is worse and thereby determine that there is an excessive deviation between the coils.

Figure 5:
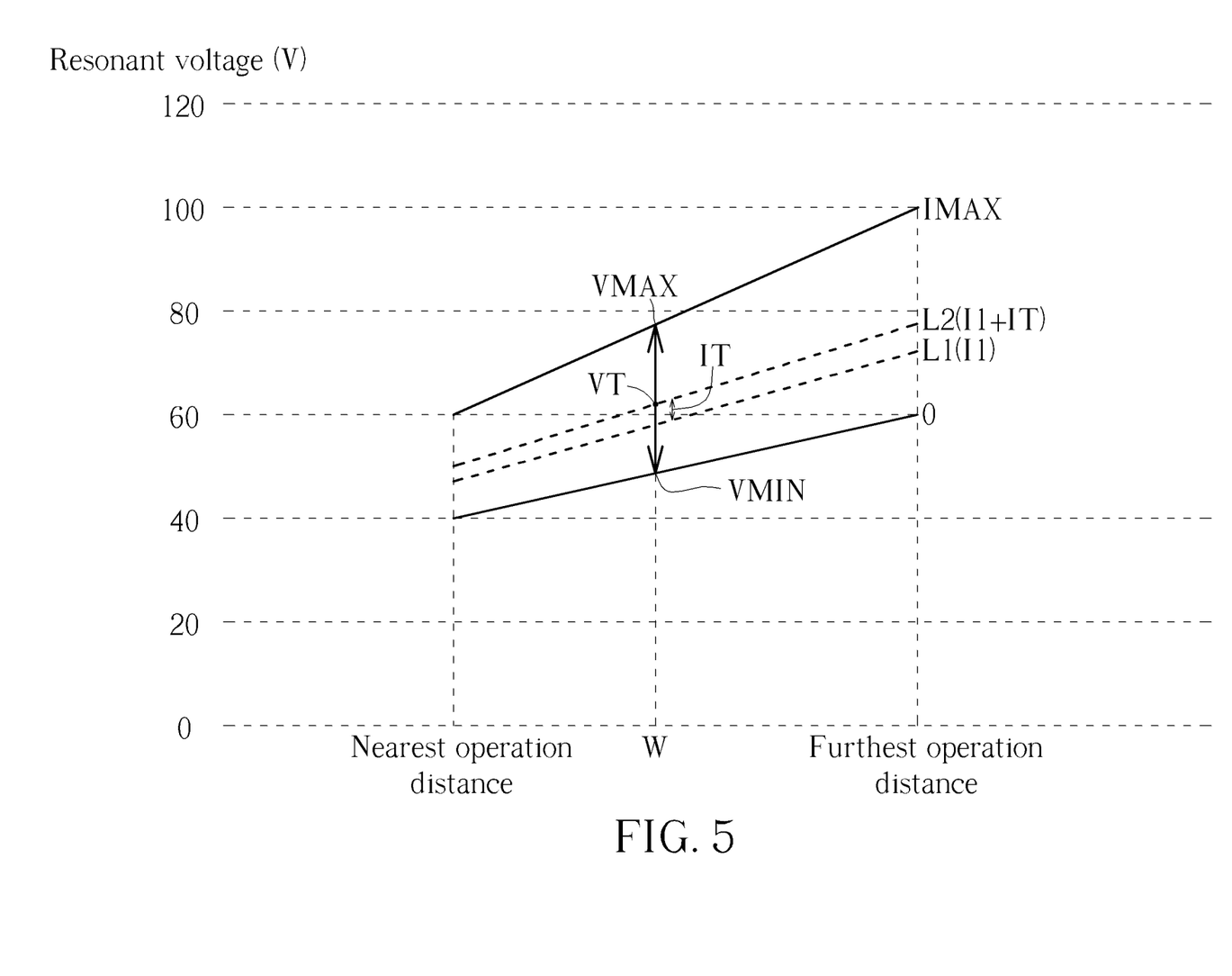
FIG. 5 is a schematic diagram of determining the coil deviation based on the resonant voltage of coil and the input current according to an embodiment of the present invention.

In such a condition, the supplying-end processor 11 may determine whether there is a deviation between the supplying-end coil 16 and the receiving-end coil 26 according to the maximum resonant voltage VMAX and the minimum resonant voltage VMIN and the input current of the supplying-end coil 16, i.e., determine whether a deviation occurs or there is an excessively large deviation between the supplying-end module 1 and the receiving-end module 2. Please refer to FIG. 5, which is a schematic diagram of determining the coil deviation based on the resonant voltage of coil and the input current according to an embodiment of the present invention. Assume that the distance between the supplying-end coil 16 and the receiving-end coil 26 is W, which is corresponding to the maximum resonant voltage VMAX and the minimum resonant voltage VMIN, wherein the input current is IMAX when the maximum resonant voltage VMAX is outputted by the supplying-end module 1 (i.e., the full-load current), and the input current is 0 when the minimum resonant voltage VMIN is outputted by the supplying-end module 1 (i.e., the input current only includes currents for the processing circuits which may be omitted herein). In FIG. 5, the line L1 refers to the resonant voltage of coil corresponding to a present input current I1 of the supplying-end module 1, and the line L2 refers to a threshold resonant voltage VT corresponding to a current value obtained by adding a threshold current IT to the present input current I1. According to the ratio of the input current I1 and the full-load current IMAX, the resonant voltage V1 may be calculated as follows:

$$V1 = (VMAX - VMIN) \times \frac{I1}{IMAX} + VMIN;$$

wherein the obtained resonant voltage V1 is a likely output voltage of the supplying-end coil 16 without coil deviations. Further, according to the maximum resonant voltage VMAX, the minimum resonant voltage VMIN, and the input current I1, the supplying-end processor 11 may calculate the threshold resonant voltage VT as follows:

$$VT = (VMAX - VMIN) \times \frac{I1 + IT}{IMAX} + VMIN.$$

As can be seen from above, the coil deviation may cause that the supplying-end device determines the resonant voltage of coil rises abnormally. Therefore, when the supplying-end processor 11 determines that the present resonant voltage of the supplying-end coil 16 is greater than the threshold resonant voltage VT, the supplying-end processor 11 may determine that there is an excessively large deviation between the coils and thereby take proper measures. In an embodiment, the supplying-end processor 11 may control the supplying-end module 1 to stop outputting electric power when determining that the supplying-end coil 16 and the receiving-end coil 26 have an excessively large deviation. Alternatively, in order to prevent wrong determinations due to noise interferences, the supplying-end module 1 may stop outputting electric power when the coil deviation is determined to be excessively large by multiple successive times. In an embodiment, when the coil deviation is excessively large, the supplying-end module 1 may also perform protection steps and/or deliver warning signals (e.g., by using a display, an indicator light, or a buzzer, etc.).

Please note that the present invention aims at providing a method of detecting the distance between the receiving-end module and the supplying-end module and accordingly setting the upper and lower limits of the resonant voltage of the supplying-end coil, in order to determine whether there is a deviation between the supplying-end module and the receiving-end module according to the coil voltage and current magnitude. Those skilled in the art may make modifications and alternations accordingly. For example, in the above embodiments, the supplying-end processor 11 may determine the status of coil deviation by detecting the input current of the supplying-end module 1, and this input current may be detected via the current detector 18 coupled between the power source 10 and the supplying-end module 1, as shown in FIG. 1. Since the current consumed by the supplying-end processor 11 is quite small, the current inputted to the supplying-end module 1 may be substantially equal to the current consumed by the supplying-end coil 16 during power supply operations. In another embodiment, in order to detect the current of the supplying-end coil 16 more accurately, the current detector may be disposed at another place on the current path flowing through the supplying-end coil 16, e.g., disposed at the front of the clock generator 112. As long as the induction type power supply system 100 has a module, device or functionality for detecting the coil current, the implementation or operation method of current detection should not limit the scope of the present invention. In addition, in the embodiments of the present invention, determination of the distance and/or deviation between the supplying-end device and the receiving-end device is one of the main technical features, where the supplying-end device maybe considered as the supplying-end coil or the supplying-end module, and the receiving-end device may be considered as the receiving-end coil or the receiving-end module. In other words, the determined distance/deviation in the present invention may be the distance/deviation between the supplying-end module and the receiving-end module, the distance/deviation between the supplying-end coil and the receiving-end coil, the distance/deviation between the supplying-end coil and the receiving-end module, or the distance/deviation between the supplying-end module and receiving-end coil. These descriptions in the present disclosure are all applicable and interchangeable. All of these distances may correspond to the maximum resonant voltage and the minimum resonant voltage, as a basis for setting the output power and determining the deviation. All of these deviations may be considered as a basis for determining whether to stop outputting electric power.

Figure 6:
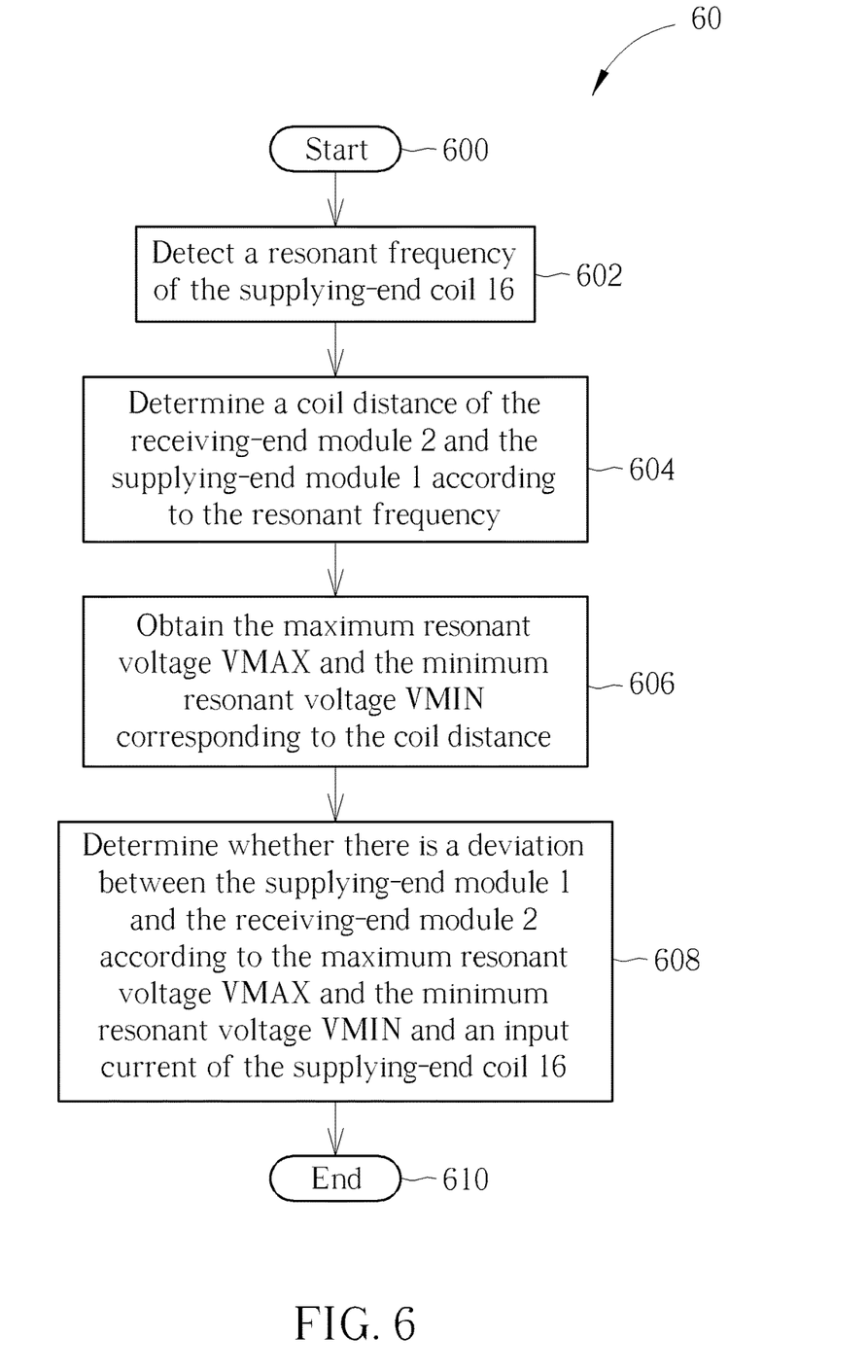
FIG. 6 is a schematic diagram of a detection process according to an embodiment of the present invention.

The abovementioned methods of the supplying-end module detecting the receiving-end module and determining the coil deviation may be summarized into a detection process 60, as shown in FIG. 6. The detection process 60, which maybe used for a supplying-end device of an induction type power supply system such as the supplying-end module 1 shown in FIG. 1, includes the following steps:

Step 600: Start.

Step 602: Detect a resonant frequency of the supplying-end coil 16.

Step 604: Determine a coil distance of the receiving-end module 2 and the supplying-end module 1 according to the resonant frequency.

Step 606: Obtain the maximum resonant voltage VMAX and the minimum resonant voltage VMIN corresponding to the coil distance.

Step 608: Determine whether there is a deviation between the supplying-end module 1 and the receiving-end module 2 according to the maximum resonant voltage VMAX and the minimum resonant voltage VMIN and an input current of the supplying-end coil 16.

Step 610: End.

The detailed operations and alternations related to the detection process 60 are illustrated in the above paragraphs, and will not be narrated herein.

To sum up, the present invention provides a detecting method capable of detecting the distance between the receiving-end module and the supplying-end module and accordingly setting the upper and lower limits of the resonant voltage of the supplying-end coil, so as to determine whether there is a deviation between the supplying-end module and the receiving-end module according to the magnitudes of the coil voltage and input current. The supplying-end processor may obtain the furthest operation distance and the nearest operation distance according to the self-resonant frequency of the supplying-end coil, and obtain the maximum/minimum resonant voltages corresponding to the furthest operation distance and the nearest operation distance, respectively. The obtained maximum and minimum resonant voltages may be used to calculate and obtain the upper and lower limits of the resonant voltage under different coil distances. Subsequently, the deviation is determined based on the resonant voltage of the coil with a specific distance and the input current of the supplying-end coil. That is, the supplying-end processor may calculate a threshold resonant voltage according to the input current, and determine whether the present resonant voltage exceeds the threshold resonant voltage, so as to determine whether the coil deviation occurs or the deviation is excessively large. When the coil deviation is excessively large, the supplying-end device may not be able to accurately determine the upper and lower limits of the resonant voltage; hence, the supplying-end module may stop outputting electric power, in order to avoid any danger.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting a receiving-end module, for a supplying-end module of an induction type power supply system, the supplying-end module comprising a supplying-end coil, the method comprising:
   detecting a resonant frequency of the supplying-end coil;
   determining a coil distance of the receiving-end module and the supplying-end module according to the resonant frequency;
   obtaining a maximum resonant voltage and a minimum resonant voltage corresponding to the coil distance; and
   determining whether there is a deviation between the supplying-end module and the receiving-end module according to the maximum resonant voltage and the minimum resonant voltage and an input current of the supplying-end coil.

2. The method of claim 1, wherein the step of determining whether there is a deviation between the supplying-end module and the receiving-end module according to the maximum resonant voltage and the minimum resonant voltage and the input current of the supplying-end coil comprises:
   obtaining a present resonant voltage of the supplying-end coil;
   calculating a threshold resonant voltage according to the maximum resonant voltage and the minimum resonant voltage and the input current of the supplying-end coil; and
   determining that there is an excessively large deviation between the supplying-end module and the receiving-end module when determining that the present resonant voltage is greater than the threshold resonant voltage.

3. The method of claim 1, wherein the step of obtaining the maximum resonant voltage and the minimum resonant voltage corresponding to the coil distance comprises:
   obtaining a furthest distance and a nearest distance within an operation range of the induction type power supply system;
   setting a first maximum resonant voltage and a first minimum resonant voltage corresponding to the furthest distance, and setting a second maximum resonant voltage and a second minimum resonant voltage corresponding to the nearest distance; and
   calculating the maximum resonant voltage corresponding to the coil distance according to the first maximum resonant voltage and the second maximum resonant voltage, and calculating the minimum resonant voltage corresponding to the coil distance according to the first minimum resonant voltage and the second minimum resonant voltage.

4. The method of claim 1, wherein the maximum resonant voltage is an output voltage of the supplying-end module when the induction type power supply system has full load, and the minimum resonant voltage is an output voltage of the supplying-end module when the induction type power supply system has no load.

5. The method of claim 1, wherein the supplying-end module stops outputting electric power when the supplying-end module and the receiving-end module are determined to have an excessively large deviation.

6. A supplying-end module for an induction type power supply system, comprising:
   a supplying-end coil;
   a current detector, for detecting an input current of the supplying-end coil; and
   a processor, coupled to the supplying-end coil, for performing the following steps:
     detecting a resonant frequency of the supplying-end coil;
     determining a coil distance of the receiving-end module and the supplying-end module according to the resonant frequency;
     obtaining a maximum resonant voltage and a minimum resonant voltage corresponding to the coil distance; and
     determining whether there is a deviation between the supplying-end module and the receiving-end module according to the maximum resonant voltage and the minimum resonant voltage and the input current.

7. The supplying-end coil of claim 6, wherein the processor further performs the following steps to determine whether there is a deviation between the supplying-end module and the receiving-end module according to the maximum resonant voltage and the minimum resonant voltage and the input current:

obtaining a present resonant voltage of the supplying-end coil;

calculating a threshold resonant voltage according to the maximum resonant voltage and the minimum resonant voltage and the input current; and     determining that there is an excessively large deviation between the supplying-end module and the receiving-end module when determining that the present resonant voltage is greater than the threshold resonant voltage.

8. The supplying-end coil of claim 6, wherein the processor further performs the following steps to obtain the maximum resonant voltage and the minimum resonant voltage corresponding to the coil distance:

obtaining a furthest distance and a nearest distance within an operation range of the induction type power supply system;

setting a first maximum resonant voltage and a first minimum resonant voltage corresponding to the furthest distance, and setting a second maximum resonant voltage and a second minimum resonant voltage corresponding to the nearest distance; and     calculating the maximum resonant voltage corresponding to the coil distance according to the first maximum resonant voltage and the second maximum resonant voltage, and calculating the minimum resonant voltage corresponding to the coil distance according to the first minimum resonant voltage and the second minimum resonant voltage.

9. The supplying-end coil of claim 6, wherein the maximum resonant voltage is an output voltage of the supplying-end module when the induction type power supply system has full load, and the minimum resonant voltage is an output voltage of the supplying-end module when the induction type power supply system has no load.

10. The supplying-end coil of claim 6, wherein the supplying-end module stops outputting electric power when the supplying-end module and the receiving-end module are determined to have an excessively large deviation.

\* \* \* \* \*